(12) United States Patent
Hibino et al.

(10) Patent No.: US 11,279,218 B2
(45) Date of Patent: Mar. 22, 2022

(54) TRANSAXLE

(71) Applicant: Toyota Jidosha Kabushiki Kaisha, Toyota (JP)

(72) Inventors: Akira Hibino, Susono (JP); Takahiro Shiina, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/142,621

(22) Filed: Jan. 6, 2021

(65) Prior Publication Data

US 2021/0213819 A1 Jul. 15, 2021

(30) Foreign Application Priority Data

Jan. 9, 2020 (JP) .............................. JP2020-002139

(51) Int. Cl.
*F16H 57/08* (2006.01)
*B60K 1/00* (2006.01)
(Continued)

(52) U.S. Cl.
CPC .............. *B60K 1/00* (2013.01); *B60B 35/125* (2013.01); *F16H 37/041* (2013.01); *F16H 57/037* (2013.01); *F16H 57/0424* (2013.01); *F16H 57/0427* (2013.01); *F16H 57/082* (2013.01); *B60K 2001/001* (2013.01); *B60T 1/005* (2013.01); *F16H 2057/02034* (2013.01); *F16H 2057/02052* (2013.01); *F16H 2057/085* (2013.01); *F16H 2702/02* (2013.01)

(58) Field of Classification Search
CPC .. B60K 1/00; B60K 2001/001; B60B 35/125; F16H 37/041; F16H 57/037; F16H 57/0424; F16H 57/0427; F16H 57/082; F16H 2057/02034; F16H 2057/02052; F16H 2057/085; F16H 2702/02; B60T 1/005; B60Y 2410/10; B60Y 2410/1022
See application file for complete search history.

(56) References Cited

U.S. PATENT DOCUMENTS 5,643,127 A * 7/1997 Yoshii ................. F16H 57/0483
475/160
7,549,940 B2 * 6/2009 Kira ........................ B60K 6/36
475/204
(Continued)

FOREIGN PATENT DOCUMENTS

JP H08240254 A 9/1996
JP 2007120519 A 5/2007

*Primary Examiner* — Justin Holmes
(74) *Attorney, Agent, or Firm* — Dinsmore & Shohl LLP

(57) ABSTRACT

A transaxle includes a planetary gear reducer and a differential device. The planetary gear reducer includes a stepped pinion, a first needle bearing, a second needle bearing, and a carrier. The stepped pinion includes a pinion shaft with which a large diameter pinion and a small diameter pinion are integrated. The first needle bearing is fitted to a part of the pinion shaft outside the large diameter pinion. The second needle bearing is fitted to a part of the pinion shaft outside the small diameter pinion. The carrier is configured to support the stepped pinion via the first needle bearing and the second needle bearing such that the stepped pinion is rotatable with respect to the carrier, and to couple the stepped pinion and the differential device.

20 Claims, 5 Drawing Sheets

(51) Int. Cl.
  *B60B 35/12* (2006.01)
  *F16H 37/04* (2006.01)
  *F16H 57/037* (2012.01)
  *F16H 57/04* (2010.01)
  *B60T 1/00* (2006.01)
  *F16H 57/02* (2012.01)

(56) References Cited

U.S. PATENT DOCUMENTS

| | | | |
|---|---|---|---|
| 8,961,360 B2* | 2/2015 | Ooiso | B60K 17/046 |
| | | | 475/331 |
| 2006/0223670 A1 | 10/2006 | Nishikawa et al. | |
| 2011/0207570 A1 | 8/2011 | Tanaka et al. | |
| 2019/0210589 A1* | 7/2019 | Tanaka | B60W 10/182 |
| 2019/0285175 A1* | 9/2019 | Tanaka | F16H 63/48 |

* cited by examiner

TRANSAXLE

CROSS-REFERENCE TO RELATED APPLICATION

This application claims priority to Japanese Patent Application No. 2020-002139 filed on Jan. 9, 2020, incorporated herein by reference in its entirety.

BACKGROUND

1. Technical Field

The present disclosure relates to transaxles.

2. Description of Related Art

In a vehicle that uses an electric motor as a drive force device, a transaxle in which a planetary gear reducer and a differential device are integrated is used as an example of a device that transmits drive force of the electric motor to an axle. The electric motor and the transaxle are also integrated. The electric-motor-integrated transaxle is downsized by disposing the electric motor coaxially with the axle and passing the axle through an output shaft of the electric motor. Further, a stepped pinion composed of a large diameter pinion and a small diameter pinion is adopted as the pinion of the planetary gear reducer. According to the stepped pinion, the diameter of the planetary gear reducer can be reduced while maintaining the reduction ratio.

Japanese Unexamined Patent Application Publication No. 08-240254 (JP 08-240254 A) discloses a transaxle in which a planetary gear reducer and a differential device are integrated. The planetary gear reducer of the transaxle disclosed in JP 08-240254 A includes a stepped pinion 200 having the configuration shown in FIG. 6. The stepped pinion 200 has a structure in which a large diameter pinion 201 is integrated with a small diameter pinion 202. The large diameter pinion 201 is meshed with a sun gear 210 provided on the output shaft of the electric motor, and the small diameter pinion 202 is meshed with a ring gear 211 fixed to a housing. A pinion shaft 205 is passed through the inside of the stepped pinion 200, and the stepped pinion 200 is supported by the pinion shaft 205 via needle bearings 206, 207 so as to be rotatable with respect to the pinion shaft 205. Both ends of the pinion shaft 205 are supported by a carrier 220 of the planetary gear reducer (also serving as a differential case of the differential device). Further, the axial position of the stepped pinion 200 is defined by the carrier 220 via two sets of washers 235, 236 respectively arranged at both ends of the stepped pinion 200.

In the planetary gear reducer having the stepped pinion 200 configured as described above, in order to reduce the size of the planetary gear reducer while maintaining the reduction ratio, it is required to reduce the diameter of the small diameter pinion 202. However, since it is necessary to accommodate the pinion shaft 205 and the needle bearings 206, 207 inside the small diameter pinion 202, there is a limit to reducing the diameter of the small diameter pinion 202. In other words, with the configuration of the planetary gear reducer disclosed in JP 08-240254 A, further downsizing is difficult.

In addition to the planetary gear reducer disclosed in JP 08-240254 A, for example, a planetary gear reducer including a stepped pinion 300 having the configuration shown in FIG. 7 has been put into practical use. In the stepped pinion 300, a large diameter pinion 301 that meshes with a sun gear 310 and a small diameter pinion 302 that meshes with a ring gear 311 are integrated with a pinion shaft 303. The pinion shaft 303 is supported by a carrier 320 via two bearings 306, 307 fitted to the outer peripheral surface of the pinion shaft 303 so as to be rotatable with respect to the carrier 320. One bearing 307 is fitted to a part of the shaft surface of the pinion shaft 303 located outside the small diameter pinion 302. A needle bearing can be used as the bearing 307. The other bearing 306 is fitted to a part of the shaft surface of the pinion shaft 303 located between the large diameter pinion 301 and the small diameter pinion 302. A ball bearing is used as the bearing 306, because the bearing 306 needs to receive a thrust force in the axial direction. Since the ball bearing 306 receives a thrust force, a snap ring 335 is assembled between the ball bearing 306 and the carrier 320 and a snap ring 336 is assembled between the ball bearing 306 and the pinion shaft 303.

In general, a ball bearing has a larger radial sectional height than a needle bearing, so that the size of the device when using the ball bearing is larger than that when using the needle bearing. In the case of the stepped pinion 300 configured as described above, since the large diameter pinion 301 is cantilevered, a large load is applied to the ball bearing 306. In order to withstand the large load, it is necessary to increase the size of the ball bearing 306. Thus, the carrier 320 that supports the ball bearing 306 must also be increased in size. In other words, even in the case of the planetary gear reducer including the stepped pinion 300 having the configuration shown in FIG. 7, there is a limit to downsizing of the planetary gear reducer.

SUMMARY

The present disclosure provides a downsized transaxle that transmits drive force of an electric motor to an axle via the planetary gear reducer and the differential device.

A transaxle according to an aspect of the present disclosure includes a planetary gear reducer, a differential device, and a transaxle case housing the planetary gear reducer and the differential device. The transaxle is configured to transmit drive force of an electric motor to an axle via the planetary gear reducer and the differential device.

The planetary gear reducer includes a stepped pinion, a first needle bearing, a second needle bearing, and a carrier. The stepped pinion includes a pinion shaft with which the large diameter pinion and the small diameter pinion are integrated. The large diameter pinion is configured to mesh with a sun gear provided in an output shaft of the electric motor. The small diameter pinion is configured to mesh with a ring gear fixed to the transaxle case.

The first needle bearing is fitted to a part of a shaft surface from a first end of the pinion shaft to the large diameter pinion. The first end is located closer to the large diameter pinion than to the small diameter pinion. The second needle bearing is fitted to a part of the shaft surface from a second end of the pinion shaft to the small diameter pinion. The second end is located closer to the small diameter pinion than to the large diameter pinion. The carrier is configured to support the stepped pinion via the first needle bearing and the second needle bearing such that the stepped pinion is rotatable with respect to the carrier. The carrier is configured to couple the stepped pinion and the differential device.

The transaxle according to the aspect of the present disclosure includes the stepped pinion having a structure in which the pinion shaft with which the small diameter pinion and the large diameter pinion are integrated is supported from the outside such that the pinion shaft is rotatable. According to the stepped pinion of the above structure, the diameter of the small diameter pinion can be reduced as compared with the structure in which the small diameter pinion and the large diameter pinion are supported from the inside by passing the pinion shaft inside the small diameter pinion and the large diameter pinion. Further, since the stepped pinion is supported at both ends, the needle bearings having a smaller radial sectional height than the ball bearings can be used as bearings. Accordingly, the transaxle according to the present embodiment can reduce the size of the entire device in the radial direction.

The transaxle according to the aspect of the present disclosure may further include a first oil introducing portion and a second oil introducing portion. The transaxle case may include a case internal oil passage. The carrier may include a carrier internal oil passage communicating with the differential device. The pinion shaft may include a shaft internal oil passage that extends along an axis of the pinion shaft. The shaft internal oil passage may include an opening at the second end and may be configured to communicate with the first needle bearing and the second needle bearing. The first oil introducing portion may be configured to introduce oil from the case internal oil passage to the carrier internal oil passage. The second oil introducing portion may be configured to introduce oil from the case internal oil passage to the shaft internal oil passage through the opening of the shaft internal oil passage at the second end. The second oil introducing portion is provided further upstream than the first oil introducing portion of the case internal oil passage.

With the transaxle according to the aspect of the present disclosure, oil can be supplied to the inside of the pinion shaft that rotates with respect to the carrier, and oil can be supplied to the needle bearings from the shaft internal oil passage. Further, since the shaft internal oil passage is provided in parallel with the carrier internal oil passage that supplies oil to the differential device, the required minimum amount of oil can be supplied to the needle bearings and the differential device.

The transaxle according to the aspect of the present disclosure may further include a first thrust washer or a first thrust bearing and a second thrust washer or a second thrust bearing. The carrier may include a first stopper configured to restrict movement of the stepped pinion in a direction toward the first end and a second stopper configured to restrict movement of the stepped pinion in a direction toward the second end. The stepped pinion may include a first facing surface facing the first stopper and a second facing surface facing the second stopper. The first thrust washer or the first thrust bearing may be provided between the first stopper and the first facing surface. The second thrust washer or the second thrust bearing may be provided between the second stopper and the second facing surface.

With the transaxle according to the aspect of the present disclosure, the axial movement of the stepped pinion can be restricted while the thrust washer or the thrust bearing receives the thrust force acting on the stepped pinion. Whether to use the thrust washer or the thrust bearing may be determined by the magnitude of the thrust force acting on the stepped pinion. The thrust force is the difference between the input from the sun gear and the reaction force from the ring gear. For example, when both of the input and the reaction force are sufficiently canceled out, a thrust washer will suffice.

In the transaxle according to the aspect of the present disclosure, the first stopper may be a first bearing boss portion into which the first needle bearing is fitted, and the first facing surface may be provided in the large diameter pinion. With the transaxle according to the aspect of the present disclosure, by using the first bearing boss portion as a stopper, it is not necessary to separately provide a member for restricting the movement of the stepped pinion in the direction toward the first end.

In the transaxle according to the aspect of the present disclosure, the second stopper may be a second bearing boss portion into which the second needle bearing is fitted, and the second facing surface may be provided in the small diameter pinion. With the transaxle according to the aspect of the present disclosure, by using the second bearing boss portion as a stopper, it is not necessary to separately provide a member for restricting the movement of the stepped pinion in the direction toward the second end.

In the transaxle according to the aspect of the present disclosure, the second stopper may be provided further outside than the second end in an axial direction of the stepped pinion, and the second facing surface may be provided in the second end. With the transaxle according to the aspect of the present disclosure, a small diameter thrust washer or a small diameter thrust bearing can be used as the second thrust washer or the second thrust bearing. In the transaxle according to the aspect of the present disclosure, the second stopper may be a parking gear attached to the carrier.

In the transaxle according to the aspect of the present disclosure, the carrier may include the first bearing boss portion into which the first needle bearing is fitted. The first bearing boss portion may include no protrusion protruding radially inward, and the first bearing boss portion and the first needle bearing may be fixed by press fitting. The second stopper may be provided in the carrier.

With the transaxle according to the aspect of the present disclosure, the radial size of the entire device can be reduced while maintaining the reduction ratio of the planetary gear reducer.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. However, in the following embodiments, when numbers of each element, such as the number, the quantity, the amount, the range, etc. thereof, are mentioned, the present disclosure is not limited by the numbers mentioned unless explicitly stated or clearly specified in theory.

1. Configuration of Transaxle According to Present Embodiment

Figure 1:
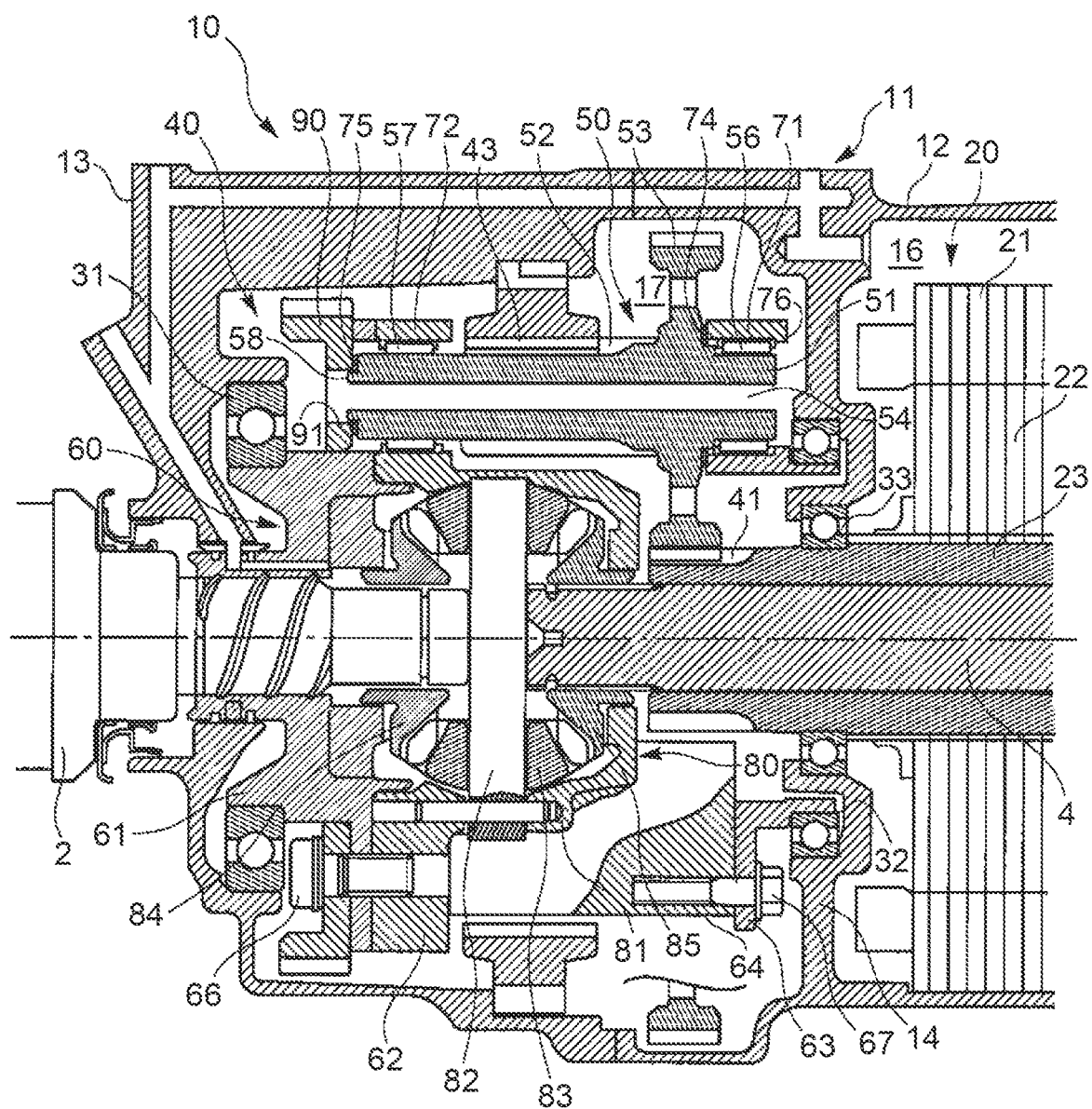
FIG. 1 is a longitudinal sectional view showing a structure of a transaxle according to an embodiment of the present disclosure.

The configuration of a transaxle according to the present embodiment will be described with reference to FIG. 1. FIG. 1 is a longitudinal sectional view showing a structure of a transaxle 10 according to the present embodiment.

The transaxle 10 is a device for transmitting a drive force of an electric motor 20 that functions as a drive force unit of a vehicle to a left axle 2 and a right axle 4, and is integrated with the electric motor 20. Specifically, the electric motor 20 is housed in a transaxle case 11 fixed to a vehicle body (not shown). The electric motor 20 has a stator 21, a rotor 22 that is rotatable with respect to the stator 21, and an output shaft 23 integrated with the rotor 22. The stator 21 is fixed to the transaxle case 11. The output shaft 23 has a tubular shape, and the axle 4 extends through the output shaft 23. However, the output shaft 23 and the axle 4 are not in contact with each other, and the output shaft 23 is rotatable with respect to the axle 4.

The transaxle case 11 is a three-part case including a cylindrical case 12 through which the axles 2, 4 extend, a bottomed cylindrical case 13 fixed to the cylindrical case 12 so as to close the opening of the cylindrical case 12 on the axle 2 side, a disk-shaped case cover (not shown) fixed to the cylindrical case 12 so as to close the opening of the cylindrical case 12 on the axle 4 side. A partition wall 14 that divides the inside of the cylindrical case 12 into two parts is provided inside the cylindrical case 12. With the partition wall 14, the inside of the transaxle case 11 is divided into a motor chamber 16 which is a space from the partition wall 14 to the case cover (not shown) and a gear chamber 17 which is a space from the partition wall 14 to the bottomed cylindrical case 13.

The above-mentioned electric motor 20 is housed in the motor chamber 16. A planetary gear reducer 40 and a differential device 80 are housed in the gear chamber 17. A through hole is provided in the partition wall 14, and the output shaft 23 of the electric motor 20 projects from the motor chamber 16 into the gear chamber 17 through the through hole. A ball bearing 33 is provided in the through hole, and the output shaft 23 is supported by the ball bearing 33 so as to be rotatable. A sun gear 41 that constitutes the planetary gear reducer 40 is provided at the tip of the output shaft 23 that projects into the gear chamber 17.

The planetary gear reducer 40 is a planetary-type speed reduction mechanism in which the sun gear 41 serves as an input element, a ring gear 43 serves as a reaction force element, and a carrier 60 serves as an output element. The ring gear 43 is fixed inside the bottomed cylindrical case 13. The ring gear 43 is provided closer to the axle 2 than the sun gear 41 is, that is, farther from the partition wall 14. A stepped pinion 50 that meshes with each of the sun gear 41 and the ring gear 43 is supported by the carrier 60 so as to be rotatable with respect to the carrier 60. Although only one stepped pinion 50 is shown in FIG. 1, the planetary gear reducer 40 has a plurality of (for example, three) stepped pinions 50, and the stepped pinions 50 are arranged at equal intervals in the circumferential direction.

The stepped pinion 50 has a structure in which a small diameter pinion 52 and a large diameter pinion 53 are integrated with a pinion shaft 51. The small diameter pinion 52 is provided on the shaft surface of the pinion shaft 51. The large diameter pinion 53 is a cylindrical gear that is coaxial and integral with the pinion shaft 51 and has a larger diameter than the small diameter pinion 52. The large diameter pinion 53 meshes with the sun gear 41, and the small diameter pinion 52 meshes with the ring gear 43. Each of the gears constituting the planetary gear reducer 40 is a helical gear with twisted teeth, and the twisting direction of the tooth trace and the lead of the small diameter pinion 52 are the same as those of the large diameter pinion 53.

Two needle bearings 56, 57 are used to support the stepped pinion 50 by the carrier 60. The first needle bearing 56 is fitted to a part of the shaft surface of the pinion shaft 51 from the end (first end) of the pinion shaft 51 on the axle 4 side to the large diameter pinion 53. The second needle bearing 57 is fitted to a part of the shaft surface of the pinion shaft 51 from the end (second end) of the pinion shaft 51 on the axle 2 side to the small diameter pinion 52. That is, the stepped pinion 50 is supported, from the radially outer side, at axial end portions of the stepped pinion 50 by the first needle bearing 56 and the second needle bearing 57 with the small diameter pinion 52 and the large diameter pinion 53 interposed therebetween. A through hole 54 is provided along the axis of the pinion shaft 51. The through hole 54 is an oil passage inside the oil shaft for supplying lubricating oil to the two needle bearings 56, 57. The oil supply system provided in the transaxle 10 will be described in detail later.

A first bearing boss portion 71 and a second bearing boss portion 72 are provided in the carrier 60. The two bearing boss portions 71, 72 are provided side by side on an axis parallel to the axles 2, 4. The first needle bearing 56 is fitted into the first bearing boss portion 71 and the second needle bearing 57 is fitted into the second bearing boss portion 72, so that the stepped pinion 50 is attached to the carrier 60 so as to be rotatable with respect to the carrier 60. A retainer 76 is provided at the end of the first bearing boss portion 71 so as to project radially inward. The retainer 76 suppresses the first needle bearing 56 from slipping out of the first bearing boss portion 71 in the axial direction of the stepped pinion 50.

Since each of the gears constituting the planetary gear reducer 40 is a helical gear, a thrust force is generated at the meshing portion between the gears. In the present embodiment, the twisting direction of the tooth trace and the lead of the small diameter pinion 52 are made equal to those of the large diameter pinion 53, so the thrust force acting on the stepped pinion 50 from the sun gear 41 and the thrust force acting on the stepped pinion 50 from the ring gear 43 are canceled out. However, although such a mechanism for canceling out the thrust force is provided, a thrust force that cannot be canceled out is generated. Therefore, the planetary gear reducer 40 is provided with a stopper that restricts the axial movement of the stepped pinion 50.

The first bearing boss portion 71 is used as a first stopper that restricts the movement of the stepped pinion 50 in the direction toward the axle 4 side. When the stepped pinion 50 is mounted on the carrier 60, the large diameter pinion 53 faces the first bearing boss portion 71. A first thrust washer 74 for receiving a thrust force acting in the direction toward the axle 4 side is provided in a gap between a surface of the large diameter pinion 53 facing the first bearing boss portion 71 (first facing surface) and the first bearing boss portion 71. By using the first bearing boss portion 71 as a stopper, it is not necessary to separately provide a member for restricting the movement of the stepped pinion 50 in the direction toward the axle 4 side. If a large thrust force acts between the first bearing boss portion 71 and the large diameter pinion 53, a thrust bearing may be provided instead of the thrust washer.

The movement of the stepped pinion 50 in the direction toward the axle 2 side is restricted by a parking gear 90 attached to the carrier 60. An opening 91 is provided in the parking gear 90, and an annular protrusion 58 is provided at the end of the pinion shaft 51 on the axle 2 side. With the protrusion 58 fitted into the opening 91, the parking gear 90 is positioned with respect to the stepped pinion 50. A second thrust washer 75 for receiving the thrust force acting in the direction toward the axle 2 side is fitted into the gap between the surface of the end of the pinion shaft 51 on the axle 2 side facing the parking gear 90 (second facing surface) and the parking gear 90, that is, around the protrusion 58. By using the parking gear 90 as a second stopper, it is not necessary to separately provide a member for restricting the movement of the stepped pinion 50 in the direction toward the axle 2 side. Further, since the surface of the pinion shaft 51 facing the parking gear 90 is the surface of the end of the pinion shaft 51, it is possible to use a thrust washer having a small diameter. If a large thrust force acts between the parking gear 90 and the end of the pinion shaft 51, a thrust bearing may be provided instead of the thrust washer.

The carrier 60 is divided into three parts in the axial direction of the axles 2, 4, and includes a first divided body 61, a second divided body 62, and a third divided body 63. The first divided body 61 located on the axle 2 side is supported by the bottom of the bottomed cylindrical case 13 via a ball bearing 31 so as to be rotatable with respect to the bottomed cylindrical case 13. A sleeve is provided in the first divided body 61, and the sleeve extends through the bottomed cylindrical case 13. Further, the axle 2 protruding into the gear chamber 17 extends through the sleeve of the first divided body 61. The portion between the outer peripheral surface of the sleeve of the first divided body 61 and the through hole of the bottomed cylindrical case 13 and the portion between the inner peripheral surface of the sleeve of the first divided body 61 and the surface of the axle 2 serve as a slide bearings.

The first divided body 61 is interposed between the second divided body 62 and the parking gear 90. The second divided body 62 is connected to the first divided body 61 with a bolt 66 together with the parking gear 90. The second bearing boss portion 72 that supports the stepped pinion 50 is provided in the second divided body 62. Specifically, the second divided body 62 is provided with a plurality of (for example, three) second bearing boss portions 72 at regular intervals in the circumferential direction in accordance with the number of stepped pinions 50 installed. The second divided body 62 is bulged in a dome shape from the first divided body 61 in the direction toward the axle 4 side, and the dome shaped portion also serves as a differential case 81 of the differential device 80. An opening is provided at the top portion of the differential case 81 that is bulged in a dome shape, and the tip of the axle 4 extends through the opening to the inside of the differential case 81. Further, the tip of the axle 2 that extends though the first divided body 61 also extends to the inside of the differential case 81.

The third divided body 63 located on the axle 4 side is supported by the partition wall 14 via a ball bearing 32 so as to be rotatable with respect to the partition wall 14. The third divided body 63 is an annular component, and the output shaft 23 extends through the opening of the third divided body 63. The first bearing boss portion 71 that supports the stepped pinion 50 is provided in the third divided body 63. Specifically, the third divided body 63 is provided with a plurality of (for example, three) first bearing boss portions 71 at regular intervals in the circumferential direction in accordance with the number of stepped pinions 50 installed. The third divided body 63 is connected to the second divided body 62 by a support column 64. Specifically, the same number of (for example, three) support columns 64 as the stepped pinions 50 are provided at regular intervals in the circumferential direction, and the support columns 64 are connected to the third divided body 63 with bolts 67. FIG. 1 shows a section of a part of the support column 64.

The carrier 60, which is constituted by coupling the above-mentioned three divided bodies 61, 62, and 63 together, is supported by the bottom of the bottomed cylindrical case 13 and the partition wall 14 at both ends of the carrier 60 in the axial direction of the axles 2, 4 via the ball bearings 31, 32 so as to be rotatable with respect to the bottomed cylindrical case 13 and the partition wall 14. The drive force of the electric motor 20 that is input to the sun gear 41 is input to the stepped pinion 50 from the sun gear 41, and is input to the ring gear 43 from the stepped pinion 50. Since the ring gear 43 is fixed, a reaction force acts on the stepped pinion 50 from the ring gear 43 to rotate the carrier 60 supporting the stepped pinion 50 in the same direction as the rotation of the output shaft 23 of the electric motor 20.

The differential device 80 includes a differential side gear 84 fixed to the end of the axle 2 with a spline, a differential side gear 85 fixed to the end of the axle 4 with a spline, and differential pinions 83 meshing with both the differential side gear 84 and the differential side gear 85. The differential pinions 83 and the differential side gears 84, 85 are housed in the differential case 81. The differential side gear 84 and the differential side gear 85 face each other and are positioned coaxially with each other, and a pinion shaft 82 radially extends therebetween. The pinion shaft 82 is fixed to the differential case 81. The pair of differential pinions 83 facing each other is supported by the pinion shaft 82 so as to be rotatable with respect to the pinion shaft 82. When the carrier 60 rotates, the differential case 81 integrated with the carrier 60 rotates together with the differential pinions 83, and the differential pinions 83 drive the left differential side gear 84 and the right differential side gear 85, whereby the left axle 2 and the right axle 4 rotate.

2. Effect of Transaxle According to Present Embodiment

Figure 2A:
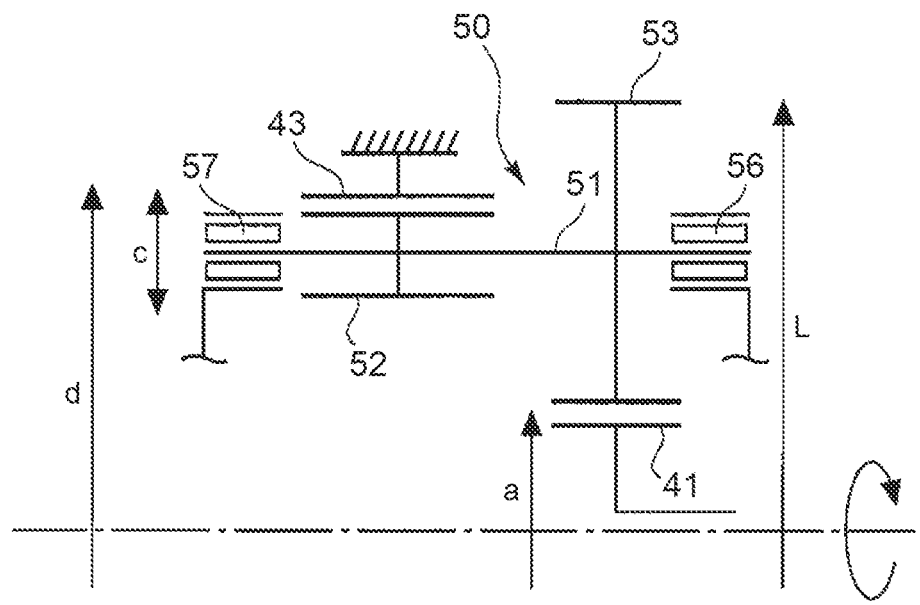
FIG. 2A is an explanatory diagram for describing the structural effect of the transaxle according to the embodiment of the present disclosure in comparison with a transaxle in the related art.
Figure 2B:
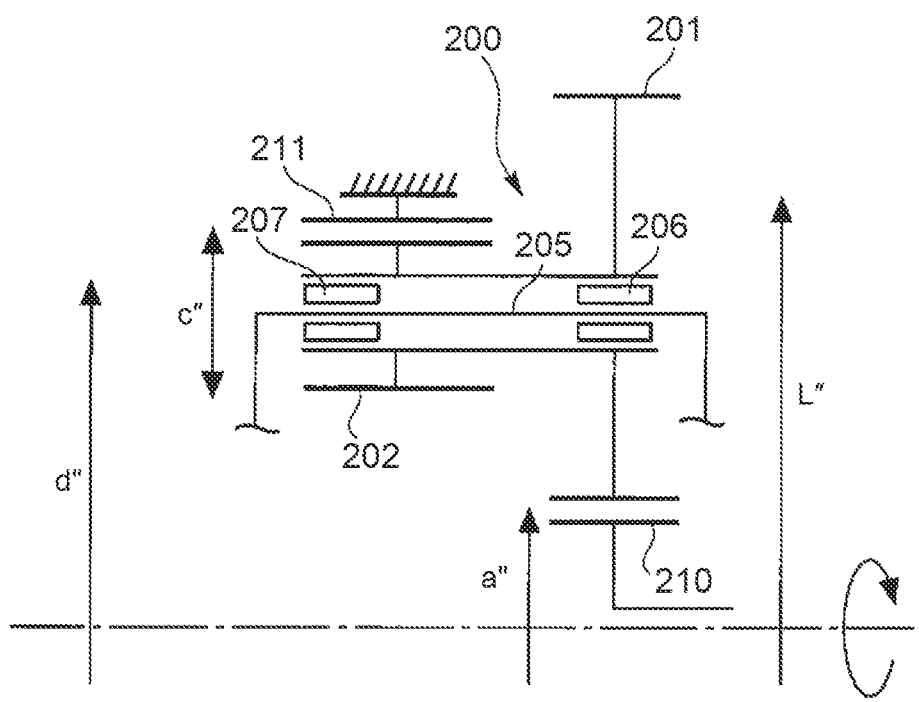
FIG. 2B is an explanatory diagram for describing the structural effect of the transaxle according to the embodiment of the present disclosure in comparison with the transaxle in the related art.

Next, the structural effect of the transaxle according to the present embodiment will be described with reference to FIGS. 2A and 2B. FIG. 2A schematically shows the structure of the planetary gear reducer of the transaxle according to the present embodiment, and FIG. 2B schematically shows a planetary gear reducer of a transaxle in the related art disclosed in JP 08-240254 A. In order to achieve the goal of downsizing of the transaxle, it is necessary to reduce the diameter of the planetary gear reducer. In particular, when the planetary gear reducer includes a stepped pinion as in the transaxle according to the present embodiment and the transaxle in the related art disclosed in JP 08-240254 A, in order to reduce the diameter of the planetary gear reducer, it is necessary to reduce raceway diameters L, L" of the large diameter pinions.

Here, as shown in FIG. 2A, when the diameter of the sun gear 41 is a, the diameter of the small diameter pinion 52 is c, the diameter of the ring gear 43 is d, and the gear ratio is r, the raceway diameter L of the large diameter pinion 53 is expressed by Equation 1 below. Similarly, as shown in FIG. 2B, when the diameter of the sun gear 210 is a", the diameter of the small diameter pinion 202 is c", the diameter of the ring gear 211 is d", and the gear ratio is r", the raceway diameter L" of the large diameter pinion 201 is expressed by Equation 2 below.

$$L=(1+2/d(r-1)c)a \qquad \text{Equation 1}$$

$$L''=(1+2/d''(r''-1)c'')a'' \qquad \text{Equation 2}$$

It is understood from the above Equations 1 and 2 that in order to reduce the raceway diameters L, L" of the large diameter pinions 53, 201 while maintaining the gear ratio, it is necessary to reduce the diameters c, c" of the small diameter pinions 52, 202. However, in the case of the transaxle in the related art, the stepped pinion 200 of the planetary gear reducer needs to house the pinion shaft 205 and the needle bearings 206, 207 inside the small diameter pinion 202. Therefore, there is a limit in reducing the diameter of the small diameter pinion 202.

On the other hand, the transaxle according to the present embodiment includes the stepped pinion 50 having a structure in which the pinion shaft 51 with which the small diameter pinion 52 and the large diameter pinion 53 are integrated is supported from the outside so as to be rotatable. According to the structure of the stepped pinion 50 shown in FIG. 2A, the diameter of the small diameter pinion 52 can be reduced as compared with the structure of the stepped pinion 200 shown in FIG. 2B. Further, since the stepped pinion 50 is supported at both ends, the needle bearings 56, 57 having a smaller radial sectional height than the ball bearings can be used as bearings for supporting the stepped pinion 50. According to the above structural effects, with the transaxle according to the present embodiment, the size of the entire device in the radial direction can be reduced.

Figure 6:
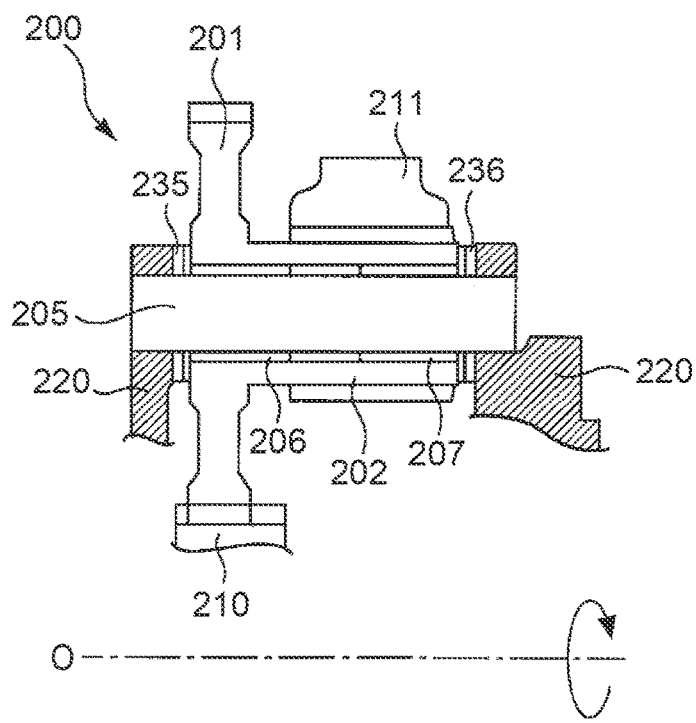
FIG. 6 is a longitudinal sectional view showing a structure of a stepped pinion included in a planetary gear reducer of a transaxle in the related art.
Figure 7:
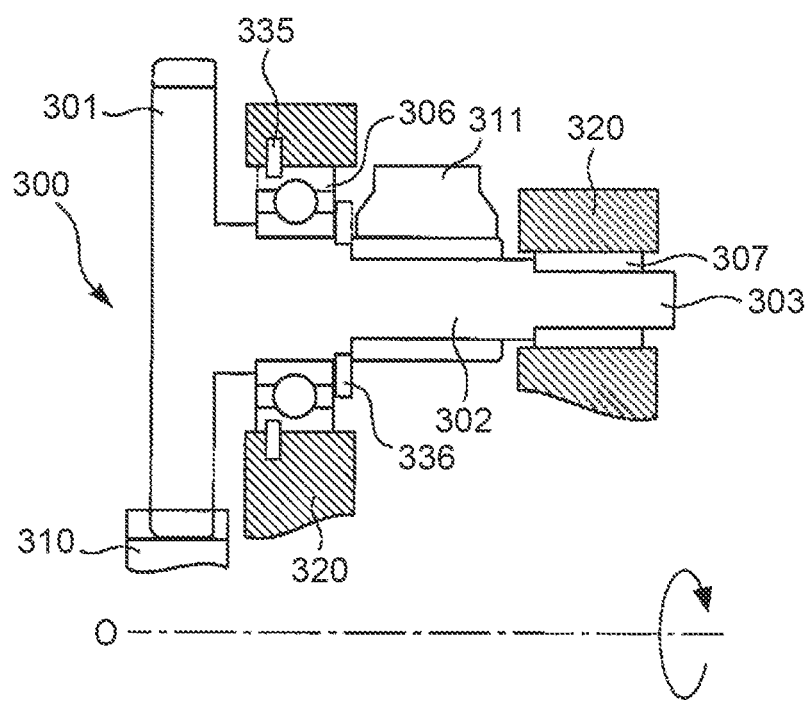
FIG. 7 is a longitudinal sectional view showing a structure of a stepped pinion included in a planetary gear reducer of a transaxle in the related art.

3. Configuration of Oil Supply System of Transaxle According to Present Embodiment In the transaxle, lubricating oil is supplied to necessary parts of the planetary gear reducer and the differential device. The bearing that allows the stepped pinion to rotate is one of the parts where oil needs to be supplied. In the transaxle in the related art shown in FIG. 6, the pinion shaft 205 is fixed to the carrier 220. Thus, an oil passage extending from the inside of the carrier 220 to the inside of the pinion shaft 205 can be provided, and oil can be supplied to the needle bearings 206, 207 provided outside the pinion shaft 205 through the oil passage. However, in the case where an oil passage for supplying oil from the carrier 220 to the pinion shaft 205 is provided, a centrifugal force acts on the oil, so that the oil is likely to flow to the pinion shaft 205 and the oil may lack on the carrier 220 side, that is, on the differential device side.

In the case of the transaxle 10 according to the present embodiment shown in FIG. 1, the pinion shaft 51 is supported by the carrier 60 via the needle bearings 56, 57 so as to be rotatable with respect to the carrier 60. Since the pinion shaft 51 rotates with respect to the carrier 60, it is difficult to provide an oil passage extending from the inside of the carrier 60 to the inside of the pinion shaft 51, as in the transaxle in the related art. Even if such an oil passage could be provided, most of the oil to be supplied to the differential device 80 may flow to the pinion shaft 51 due to the centrifugal force.

Figure 3:
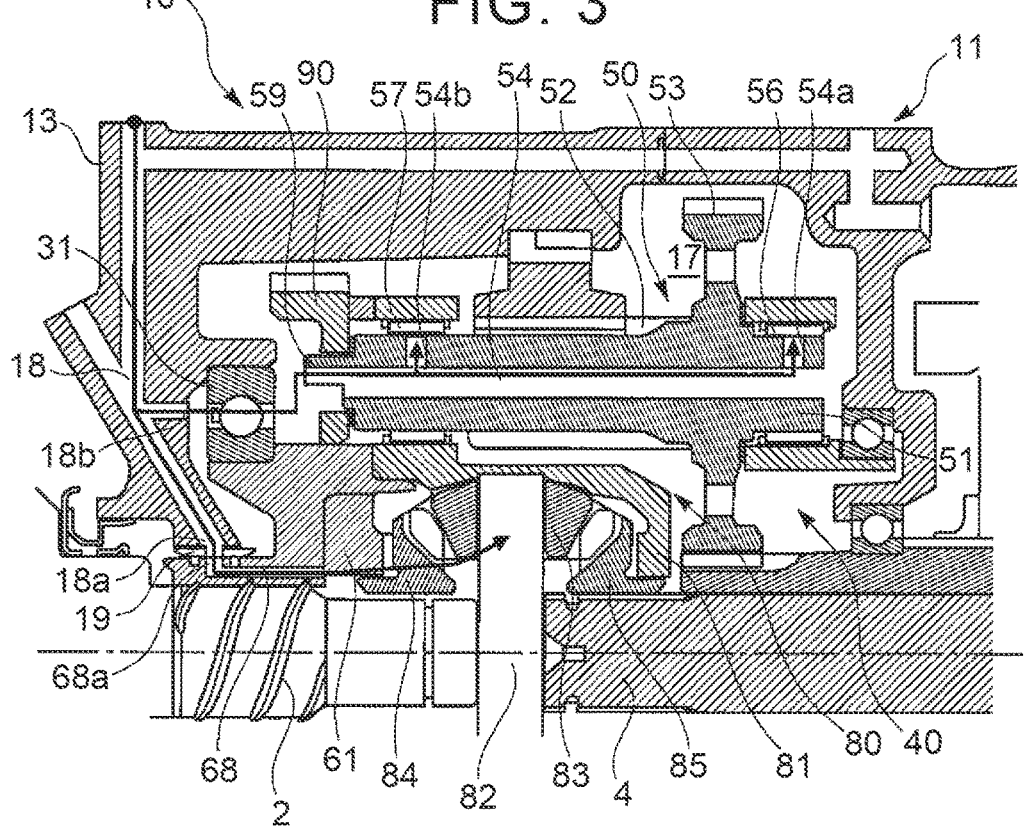
FIG. 3 is a longitudinal sectional view showing an oil supply system in the transaxle according to the embodiment of the present disclosure.

Therefore, the transaxle according to the present embodiment includes an oil supply system having the configuration shown in FIG. 3. FIG. 3 is a longitudinal sectional view showing an oil supply system in the transaxle according to the present embodiment. Note that FIG. 3 shows a section different from the section shown in FIG. 1. The locus indicated by the arrow line in FIG. 3 schematically shows the flow of oil in the transaxle.

The transaxle case 11 is provided with a case internal oil passage 18 through which oil flows. The case internal oil passage 18 provided in the bottomed cylindrical case 13 extends to the contact surface between the bottomed cylindrical case 13 and the sleeve of the first divided body 61, and has a first oil outlet 18a that opens at the contact surface. The first divided body 61 has an oil inlet 68a that opens at a position corresponding to the first oil outlet 18a, and is provided with a carrier internal oil passage 68 extending to the inside of the differential case 81.

The first oil outlet 18a of the case internal oil passage 18 and the oil inlet 68a of the carrier internal oil passage 68 are repeatedly connected and disconnected as the carrier 60 rotates. When the oil inlet 68a communicates with the first oil outlet 18a, the oil pressure applied to the oil pumps the oil from the case internal oil passage 18 to the carrier internal oil passage 68, and the oil is supplied from the carrier internal oil passage 68 to the inside of the differential case 81. The first oil outlet 18a and the oil inlet 68a constitute a first oil introducing portion that introduces oil from the case internal oil passage 18 to the carrier internal oil passage 68. An oil seal 19 for suppressing oil leakage to the outside of the transaxle case 11 is provided on the contact surface between the bottomed cylindrical case 13 and the sleeve of the first divided body 61.

A second oil outlet 18b that opens to the inside of the gear chamber 17 is provided upstream of the first oil outlet 18a in the case internal oil passage 18. The second oil outlet 18b is provided so as to face the ball bearing 31. Specifically, an oil passage extending from the case internal oil passage 18 to the second oil outlet 18b is provided so that the oil ejected from the second oil outlet 18b flows toward the ball bearing 31. The oil ejected from the second oil outlet 18b toward the ball bearing 31 scatters in the direction toward the stepped pinion 50 from the gap of the rotating ball bearing 31.

A shaft internal oil passage 54 is provided in the pinion shaft 51 so as to extend therethrough in the axial direction. A part of the oil scattered from the ball bearing 31 is introduced to the inlet of the shaft internal oil passage 54. A semicircular receiving portion 59 for receiving oil is provided at the inlet of the shaft internal oil passage 54. The oil received by the receiving portion 59 flows to the shaft internal oil passage 54. The second oil outlet 18b, the ball bearing 31, and the receiving portion 59 constitute a second oil introducing portion that introduces oil from the case internal oil passage 18 to the shaft internal oil passage 54.

Oil supply holes 54a, 54b are provided in the pinion shaft 51 so as to extend in the radial direction from the shaft internal oil passage 54. The oil supply holes 54a, 54b connect the shaft internal oil passage 54 and the needle bearings 56, 57. The oil supplied to the shaft internal oil passage 54 starts to flow to the outside from the oil supply holes 54a, 54b due to the centrifugal force, and the oil that flows outside is supplied to the needle bearings 56, 57.

By providing the oil supply system having the above configuration, according to the transaxle according to the present embodiment, oil can be supplied to the inside of the pinion shaft 51 that rotates with respect to the carrier 60, and oil can be supplied to the needle bearings 56, 57 from the shaft internal oil passage 54. Further, since the shaft internal oil passage 54 is provided in parallel with the carrier internal oil passage 68 that supplies oil to the differential device 80, the oil does not excessively flow to one side, and the required minimum amount of oil can be supplied to the needle bearings 56, 57 and the differential device 80.

4. Modification of Transaxle According to Present Embodiment

The transaxle according to the present embodiment can be modified in various ways. First, a modification of the support structure of the stepped pinion in the transaxle according to the present embodiment will be described with reference to the drawings.

Figure 4:
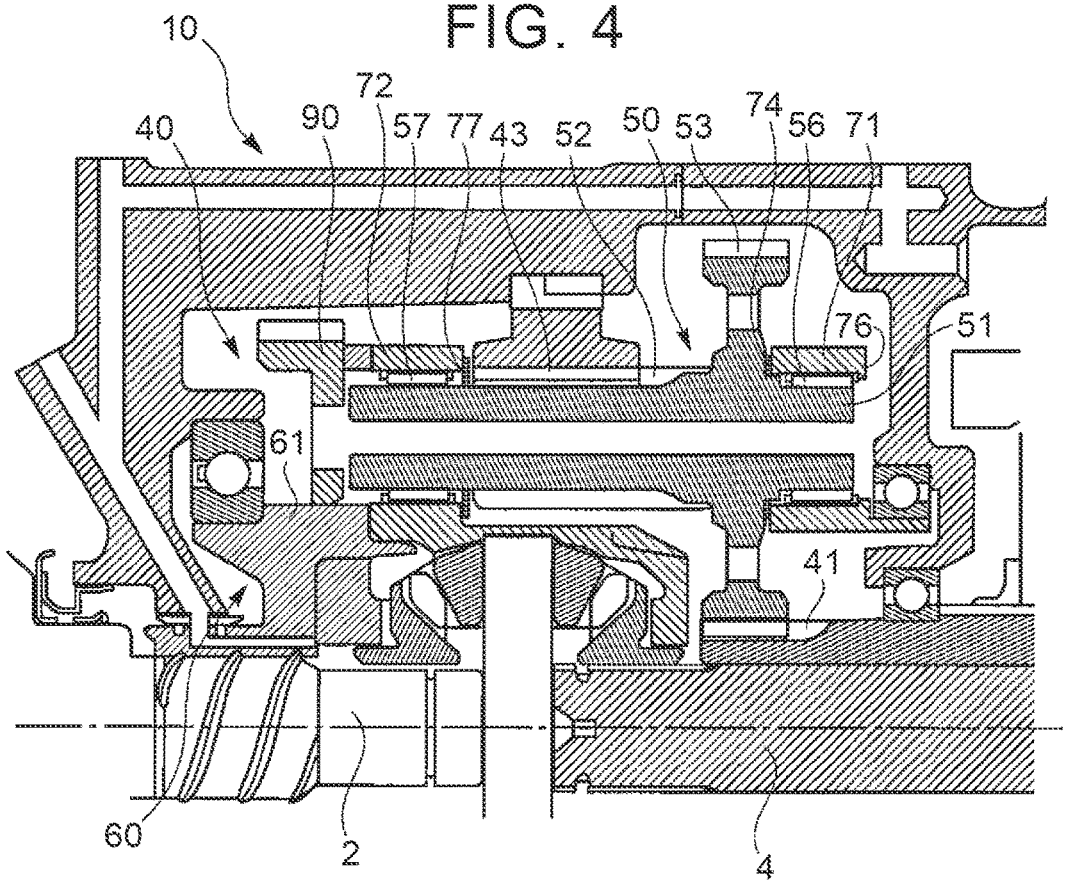
FIG. 4 is a longitudinal sectional view showing a first modification of a support structure of a stepped pinion in the transaxle according to the embodiment of the present disclosure.

FIG. 4 is a longitudinal sectional view showing a first modification of the support structure of the stepped pinion in the transaxle according to the present embodiment. In the first modification, the second bearing boss portion 72 is used as a stopper that restricts the movement of the stepped pinion 50 in the direction toward the axle 2 side. When the stepped pinion 50 is mounted on the carrier 60, the small diameter pinion 52 faces the second bearing boss portion 72. Specifically, the stepped portion of the small diameter pinion 52 faces the second bearing boss portion 72. In the first modification, a second thrust washer 77 for receiving a thrust force acting in the direction on the axle 2 side is provided in a gap between a surface of the small diameter pinion 52 facing the second bearing boss portion 72 (second facing surface) and the second bearing boss portion 72. By using the second bearing boss portion 72 as a stopper, it is not necessary to separately provide a member for restricting the movement of the stepped pinion 50 in the direction toward the axle 2 side. Further, in the first modification, since the parking gear is not used for restricting the movement of the stepped pinion 50 in the direction toward the axle 2 side, this configuration can be applied to a transaxle that does not include a parking gear. If a large thrust force acts between the second bearing boss portion 72 and the small diameter pinion 52, a thrust bearing may be provided instead of the thrust washer.

A large geometrical tolerance is required for the bearing boss portions 71, 72 of the carrier 60 that support the needle bearings 56, 57. For this reason, the processing of the bearing boss portions 71, 72 is usually performed in a state where the first divided body 61, the second divided body 62, and the third divided body 63 are temporarily assembled. However, in the case of the support structure of the stepped pinion 50 shown in FIG. 1 and the first modification shown in FIG. 4, the end of the first bearing boss portion 71 is provided with the retainer 76 protruding radially inward to suppress the needle bearing 56 from slipping out. Therefore, holes of the bearing boss portions 71, 72 can be processed only from the second bearing boss portion 72 side toward the first bearing boss portion 71 side. A second modification described below has been devised as a measure against this issue.

Figure 5:
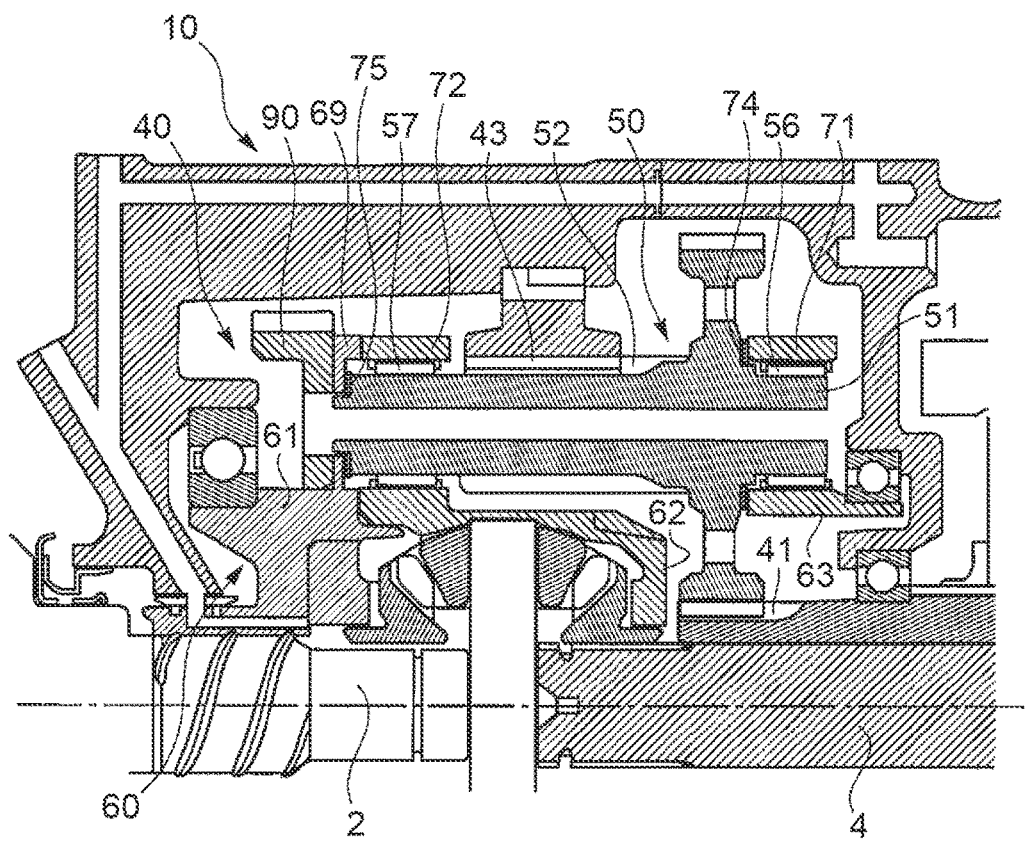
FIG. 5 is a longitudinal sectional view showing a second modification of a support structure of a stepped pinion in the transaxle according to the embodiment of the present disclosure.

FIG. 5 is a longitudinal sectional view showing a second modification of the support structure of the stepped pinion in the transaxle according to the present embodiment. In the second modification, the first bearing boss portion 71 is not provided with a retainer (see the retainer 76 in FIG. 1) that protrudes radially inward. Accordingly, holes can be processed from the first bearing boss portion 71 side toward the second bearing boss portion 72 side so as to align the inner diameters of the bearing boss portions 71, 72 with the diameters of the needle bearings 56, 57. Further, in the second modification, it is not necessary to process a hole from the second bearing boss portion 72 side, so that the stopper 69 that restricts the movement of the stepped pinion 50 in the direction toward the axle 2 side can be provided directly in the carrier 60. Specifically, the stopper 69 can be provided in the first divided body 61. Although the parking gear 90 is shown in FIG. 5, the parking gear 90 does not function as a stopper. Therefore, the second modification is also applicable to a transaxle that does not include a parking gear, as in the first modification.

The first needle bearing 56 in the second modification can be suppressed from slipping out by press-fitting the first needle bearing 56 into the first bearing boss portion 71. Specifically, based on the minimum press-fitting allowance at which the first needle bearing 56 does not move with respect to the assumed slip-out load and the maximum press-fitting allowance at which the first needle bearing 56 can rotate normally, the range of the press-fitting allowance that achieves both the above press-fitting allowances is estimated.

Next, a modification of the oil supply system in the transaxle according to the present embodiment will be described. First, in the first modification of the oil supply system, the second oil outlet 18b of the case internal oil passage 18 is provided with an orifice for adjusting the amount of oil. By adjusting the amount of oil ejected from the second oil outlet 18b with the orifice, the balance between the amount of oil supplied to each needle bearing 56, 57 and the amount of oil supplied to the differential device 80 can be appropriately managed.

In the second modification of the oil supply system, the second oil outlet 18b of the case internal oil passage 18 is provided further upstream than the position where the ball bearing 31 is provided. That is, the second oil outlet 18b is provided so that the oil ejected from the second oil outlet 18b does not hit the ball bearing 31 and directly flows to the inlet of the shaft internal oil passage 54.

What is claimed is:

1. A trans axle comprising:
   a planetary gear reducer;
   a differential device; and
   a transaxle case for housing the planetary gear reducer and the differential device, wherein:
   the transaxle is configured to transmit drive force of an electric motor to an axle via the planetary gear reducer and the differential device; and
   the planetary gear reducer includes
      a stepped pinion including a pinion shaft with which a large diameter pinion and a small diameter pinion are integrated, the large diameter pinion configured to mesh with a sun gear provided in an output shaft of the electric motor, and the small diameter pinion configured to mesh with a ring gear fixed to the transaxle case,
      a first needle bearing fitted to a part of a shaft surface between a first end of the pinion shaft and a side surface of the large diameter pinion, the first end located closer to the large diameter pinion than to the small diameter pinion,
      a second needle bearing fitted to a part of the shaft surface between a second end of the pinion shaft and a side surface of the small diameter pinion, the second end located closer to the small diameter pinion than to the large diameter pinion, and
      a carrier configured to support the stepped pinion via the first needle bearing and the second needle bearing such that the stepped pinion is rotatable with respect to the carrier, and to couple the stepped pinion and the differential device.

2. The transaxle according to claim 1, further comprising a first oil introducing portion and a second oil introducing portion, wherein:
the transaxle case includes a case internal oil passage;
the carrier includes a carrier internal oil passage communicating with the differential device;
the pinion shaft includes a shaft internal oil passage that extends along an axis of the pinion shaft, and the shaft internal oil passage includes an opening at the second end and is configured to communicate with the first needle bearing and the second needle bearing;
the first oil introducing portion is configured to introduce oil from the case internal oil passage to the carrier internal oil passage; and
the second oil introducing portion is configured to introduce oil from the case internal oil passage to the shaft internal oil passage through the opening of the shaft internal oil passage at the second end, the second oil introducing portion provided further upstream than the first oil introducing portion of the case internal oil passage.

3. The transaxle according to claim 1, further comprising a first thrust washer or a first thrust bearing and a second thrust washer or a second thrust bearing, wherein:
the carrier includes a first stopper and a second stopper, the first stopper configured to restrict movement of the stepped pinion in a direction toward the first end, and the second stopper configured to restrict movement of the stepped pinion in a direction toward the second end;
the stepped pinion includes a first facing surface facing the first stopper and a second facing surface facing the second stopper;
the first thrust washer or the first thrust bearing is provided between the first stopper and the first facing surface; and
the second thrust washer or the second thrust bearing is provided between the second stopper and the second facing surface.

4. The transaxle according to claim 3, wherein:
the first stopper is a first bearing boss portion into which the first needle bearing is fitted; and
the first facing surface is provided in the large diameter pinion.

5. The transaxle according to claim 3, wherein:
the second stopper is a second bearing boss portion into which the second needle bearing is fitted; and
the second facing surface is provided in the small diameter pinion.

6. The transaxle according to claim 3, wherein:
the second stopper is provided further outside than the second end in an axial direction of the stepped pinion; and
the second facing surface is provided in the second end.

7. The transaxle according to claim 6, wherein the second stopper is a parking gear attached to the carrier.

8. The transaxle according to claim 6, wherein:
the carrier includes a first bearing boss portion into which the first needle bearing is fitted;
the first bearing boss portion includes no protrusion protruding radially inward, and the first bearing boss portion and the first needle bearing are fixed by press fitting; and
the second stopper is provided in the carrier.

9. A transaxle comprising:
a planetary gear reducer;
a differential device; and
a transaxle case for housing the planetary gear reducer and the differential device, wherein:
the transaxle is configured to transmit drive force of an electric motor to an axle via the planetary gear reducer and the differential device; and
the planetary gear reducer includes
a stepped pinion including a pinion shaft with which a large diameter pinion and a small diameter pinion are integrated, the large diameter pinion configured to mesh with a sun gear provided in an output shaft of the electric motor, and the small diameter pinion configured to mesh with a ring gear fixed to the transaxle case,
a first needle bearing fitted to a part of a shaft surface from a first end of the pinion shaft to the large diameter pinion, the first end located closer to the large diameter pinion than to the small diameter pinion,
a second needle bearing fitted to a part of the shaft surface from a second end of the pinion shaft to the small diameter pinion, the second end located closer to the small diameter pinion than to the large diameter pinion, and
a carrier configured to support the stepped pinion via the first needle bearing and the second needle bearing such that the stepped pinion is rotatable with respect to the carrier, and to couple the stepped pinion and the differential device, the carrier including a first stopper configured to restrict movement of the stepped pinion in a direction toward the first end, the first stopper being a first bearing boss portion into which the first needle bearing is fitted.

10. The transaxle according to claim 9, further comprising a first oil introducing portion and a second oil introducing portion, wherein:
the transaxle case includes a case internal oil passage;
the carrier includes a carrier internal oil passage communicating with the differential device;
the pinion shaft includes a shaft internal oil passage that extends along an axis of the pinion shaft, and the shaft internal oil passage includes an opening at the second end and is configured to communicate with the first needle bearing and the second needle bearing;
the first oil introducing portion is configured to introduce oil from the case internal oil passage to the carrier internal oil passage; and
the second oil introducing portion is configured to introduce oil from the case internal oil passage to the shaft internal oil passage through the opening of the shaft internal oil passage at the second end, the second oil introducing portion provided further upstream than the first oil introducing portion of the case internal oil passage.

11. The transaxle according to claim 9, further comprising a first thrust washer or a first thrust bearing and a second thrust washer or a second thrust bearing, wherein:
the carrier includes a second stopper, the second stopper configured to restrict movement of the stepped pinion in a direction toward the second end;
the stepped pinion includes a first facing surface facing the first stopper and a second facing surface facing the second stopper;
the first thrust washer or the first thrust bearing is provided between the first stopper and the first facing surface; and the second thrust washer or the second thrust bearing is provided between the second stopper and the second facing surface.

12. The transaxle according to claim 11, wherein:
the first facing surface is provided in the large diameter pinion.

13. The transaxle according to claim 11, wherein:
the second stopper is a second bearing boss portion into which the second needle bearing is fitted; and
the second facing surface is provided in the small diameter pinion.

14. The transaxle according to claim 11, wherein:
the second stopper is provided further outside than the second end in an axial direction of the stepped pinion; and
the second facing surface is provided in the second end.

15. The transaxle according to claim 14, wherein the second stopper is a parking gear attached to the carrier.

16. The transaxle according to claim 14, wherein:
the first bearing boss portion includes no protrusion protruding radially inward, and the first bearing boss portion and the first needle bearing are fixed by press fitting; and
the second stopper is provided in the carrier.

17. A transaxle comprising:
a first thrust washer or a first thrust bearing and a second thrust washer or a second thrust bearing;
a planetary gear reducer;
a differential device; and
a transaxle case for housing the planetary gear reducer and the differential device, wherein:
the transaxle is configured to transmit drive force of an electric motor to an axle via the planetary gear reducer and the differential device; and
the planetary gear reducer includes
a stepped pinion including a pinion shaft with which a large diameter pinion and a small diameter pinion are integrated, the large diameter pinion configured to mesh with a sun gear provided in an output shaft of the electric motor, and the small diameter pinion configured to mesh with a ring gear fixed to the transaxle case,
a first needle bearing fitted to a part of a shaft surface from a first end of the pinion shaft to the large diameter pinion, the first end located closer to the large diameter pinion than to the small diameter pinion,
a second needle bearing fitted to a part of a shaft surface from a second end of the pinion shaft to the small diameter pinion, the second end located closer to the small diameter pinion than to the large diameter pinion, and
a carrier configured to support the stepped pinion via the first needle bearing and the second needle bearing such that the stepped pinion is rotatable with respect to the carrier, and to couple the stepped pinion and the differential device, wherein:
the carrier includes a first stopper and a second stopper, the first stopper configured to restrict movement of the stepped pinion in a direction toward the first end, and the second stopper configured to restrict movement of the stepped pinion in a direction toward the second end;
the stepped pinion includes a first facing surface facing the first stopper and a second facing surface facing the second stopper;
the first thrust washer or the first thrust bearing is provided between the first stopper and the first facing surface;
the second thrust washer or the second thrust bearing is provided between the second stopper and the second facing surface;
the first stopper is a first bearing boss portion into which the first needle bearing is fitted; and
the first facing surface is provided in the large diameter pinion.

18. The transaxle according to claim 17, wherein:
the second stopper is a second bearing boss portion into which the second needle bearing is fitted; and
the second facing surface is provided in the small diameter pinion.

19. The transaxle according to claim 17, wherein:
the second stopper is provided further outside than the second end in an axial direction of the stepped pinion; and
the second facing surface is provided in the second end.

20. The transaxle according to claim 19, wherein the second stopper is a parking gear attached to the carrier.

* * * * *